United States Patent [19]
Sink

[11] Patent Number: 5,497,038
[45] Date of Patent: Mar. 5, 1996

[54] LINEAR MOTOR PROPULSION DRIVE COIL

[75] Inventor: John D. Sink, Yorba Linda, Calif.

[73] Assignee: Power Paragon, Inc., Anaheim, Calif.

[21] Appl. No.: 224,429

[22] Filed: Apr. 8, 1994

[51] Int. Cl.⁶ .................................................. H02K 41/02
[52] U.S. Cl. ............................................. 310/12; 104/290
[58] Field of Search ................................. 310/12, 13, 14; 318/135; 104/290

[56] References Cited

U.S. PATENT DOCUMENTS

| Re. 34,674 | 7/1994 | Beakley et al. | 310/12 |
| 4,107,587 | 8/1978 | Ban et al. | 310/202 X |
| 4,274,020 | 6/1981 | Parsch et al. | 310/13 |
| 4,292,559 | 9/1981 | Auinger et al. | 310/206 |
| 4,404,485 | 9/1983 | Ban et al. | 310/198 |
| 4,583,016 | 4/1986 | Ban et al. | 310/198 |

OTHER PUBLICATIONS

Linear Synchronous Motors for Maglev, Richard D. Thornton et al. US DOT, Federal Railroad Administration, National Maglev Initiative Jan. 1993.

Power Transfer to High Speed Vehicles David Cope et al. US DOT Federal Railroad Administration, National Maglev Initiative, Jul. 1992.

Assessment of the Power Electronics for the Locally Commutated Linear Synchronous Motor (LCLSM), Frank L. Raposa, US DOT, Federal Railroad Administation, National Maglev Iniative, Feb. 1993.

*Primary Examiner*—Steven L. Stephan
*Assistant Examiner*—Judson H. Jones
*Attorney, Agent, or Firm*—Faegre & Benson

[57] ABSTRACT

A voltage propulsion drive coil assembly for a linear motor propulsion system for powering and propelling a magnetic levitation train in a track. The linear motor propulsion system includes at least one moving magnet assembly formed of a plurality of uniformly spaced pole ends with alternating magnetic polarity. The drive coil assembly includes a plurality of coils, each coil at least as long as the length of the magnet assembly and each coil at least as wide as the width of the magnet assembly. The coils and the magnet assembly are aligned lengthwise and arranged so that a constant number of coils is cut by magnetic flux lines at any given time. The coils comprise wire wound a predetermined number of turns. The number of turns in a coil is: (i) inversely proportional to the speed the train is expected to travel at that point on the track and (ii) directly proportional to the force required to propel the train at that point on the track.

22 Claims, 6 Drawing Sheets

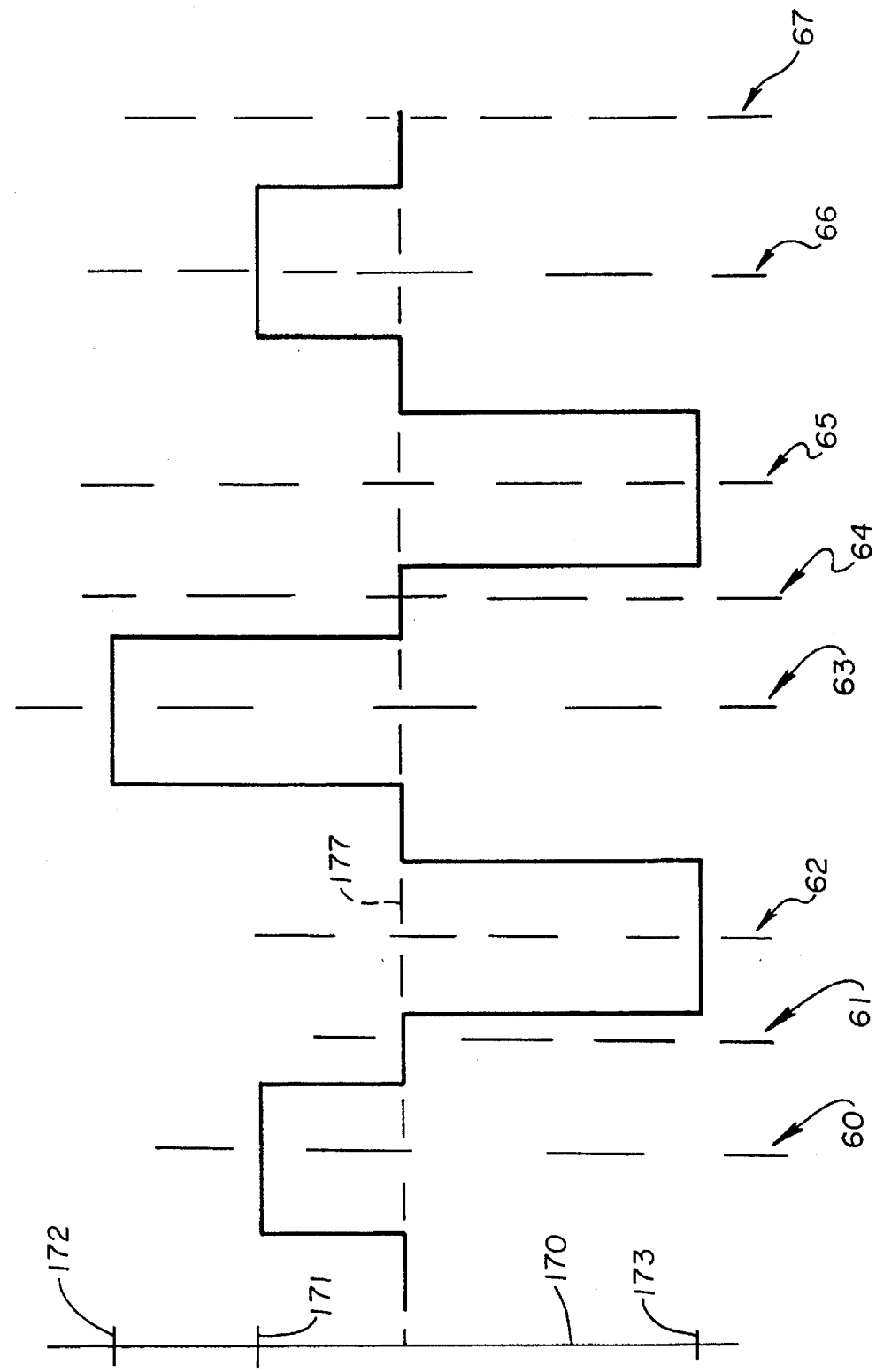

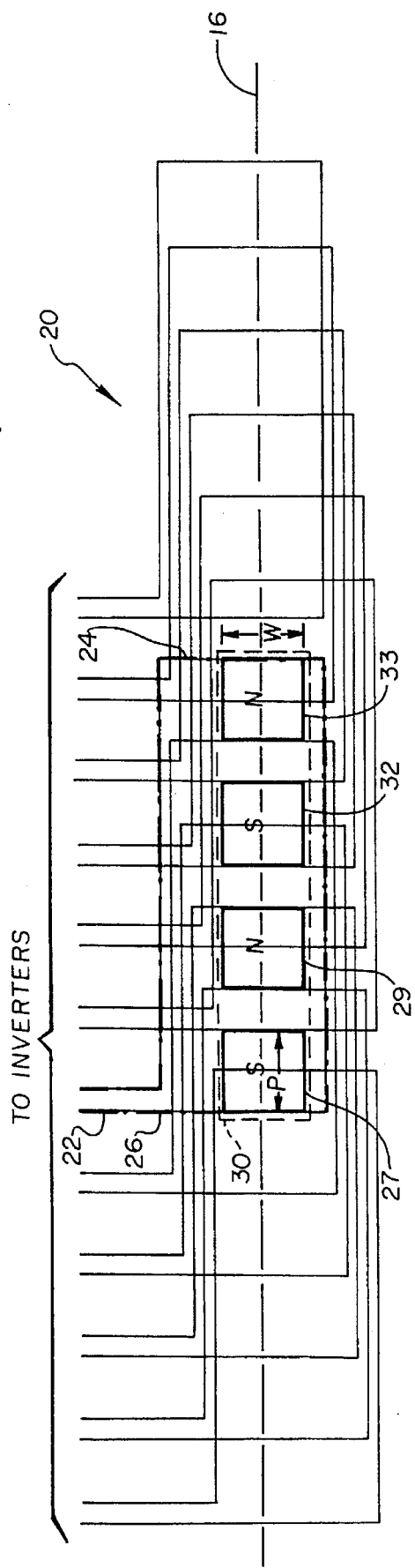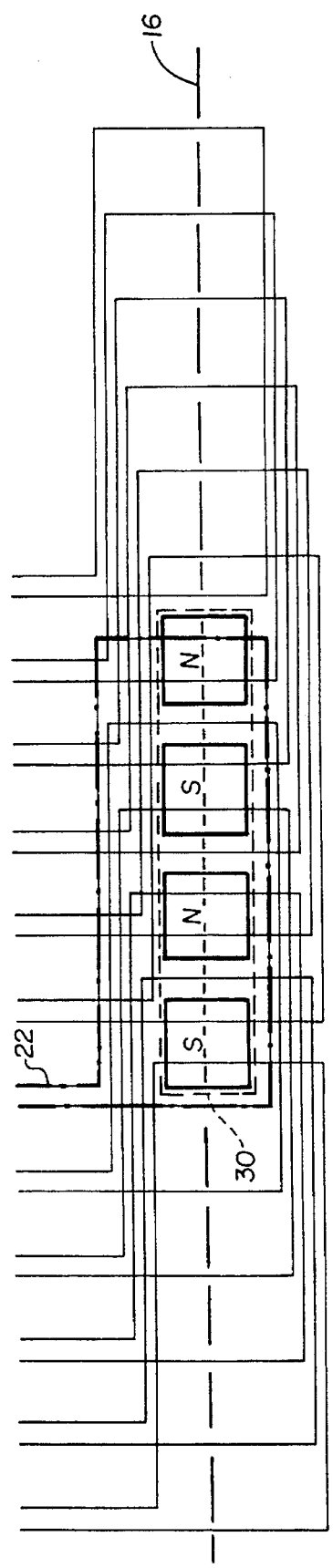

LINEAR MOTOR PROPULSION DRIVE COIL

BACKGROUND OF THE INVENTION

With the renewed interest in land-based transportation around the world, magnetic levitation (MAGLEV) vehicles are being increasingly suggested as new transportation alternatives. In a MAGLEV system, people and freight are transported for relatively long distances (100 to 1,000 km) at high speeds (135 m/s) in aerodynamically streamlined vehicles or trains suspended by magnetic forces. While the high-speed frictionless (except for air friction) operation of such trains makes them attractive, it also presents difficult challenges for the development of a suitable propulsion and power transfer systems. Linear electric motors offer the best alternative for propelling and powering such MAGLEV vehicles.

A linear sychronous motor (LSM) has a drive coil assembly or stator having a plurality of coils or windings and one or more magnet assemblies or rotors including a plurality of magnets. Propulsion or braking electromotive force (EMF) is produced by leading and trailing sides of the coils being cut by the flux lines of the magnetic fields of the magnet according to Faraday+s law. The sides of traditional coils are shaped to be cut by the flux of two opposite magnetic poles at a time, thus doubling the power output. Power and control drive electronics also are necessary to monitor the electrical power to and from the motor.

When using a LSM to propel a vehicle, multiphase electric power can be supplied in either of two ways: to coils on a guideway that defines the path of the vehicle or to coils on the vehicle. A guideway or track with powered coils (windings) is called "active guideway," "long primary" or "long stator." A system with active coils on the vehicle is called "active vehicle" or "short primary." The unpowered section of an LSM is called the field. In an active guideway LSM the current in the coils is controlled by power and control circuitry so as to create a traveling magnetic field that moves with the MAGLEV vehicle. From this synchronous movement comes the term synchronous motor.

A main obstacle for the commercial implementation of MAGLEV vehicles is cost. Given the extended distances over which a MAGLEV vehicle must travel, the cost for components for most linear motor systems is exorbitant. New linear motors that exhibit the desired power output and control, but use either existent components more efficiently or more cost efficient components are necessary. Even a relatively small savings per unit length of track will result in significant savings over a several hundred-kilometer train route.

SUMMARY OF THE INVENTION

In order to present a motor suitable for maglev transportation, the present design focuses on a motor that makes more efficient use of its drive electronics. Since the most significant components of the drive electronics are electrical inverters, the present invention discloses an improved linear motor that requires a smaller number of inverters.

The main feature of the present invention is an improved drive coil assembly. The drive coil assembly of the present invention includes a plurality of coils. These coils are shaped to be as long as the magnet assembly in a linear motor. Therefore, only one side of each coil traverses the flux lines of the magnetic fields generated by the magnet assembly at a time. The total EMF produced by the coil is still the same as in a traditional motor, only spread over a longer time period. This prevents the back EMF additive effects of a traditional coil, thus creating a two level power wave (one magnitude, but positive and negative). This reduces the voltage requirements necessary for each inverter to power the coil by a factor of two. This allows the use of either more cost-efficient inverters or cuts in half the number of inverters necessary to drive the same number of coils.

Moreover, the present drive coil assembly arranges its coils with respect to the magnets in the magnet assembly so that a constant number of coils cross over the magnetic field of each magnet at any given point. This assures constant and smooth power drive requirements. The number of turns in each coil can be adjusted by the velocity and voltage needs of a given part of the route.

BRIEF DESCRIPTION OF THE DRAWINGS

FIG. 4 shows a graph of back EMF vs. time for the prior art assembly of FIG. 3.

FIG. 5 shows a drive coil assembly and four pole magnet assembly according to the present invention in a first position.

FIG. 6 shows the drive coil assembly and four pole magnet assembly of FIG. 5 according to the present invention in a second position.

DETAILED DESCRIPTION OF THE INVENTION

The propulsion power in a maglev train is the product of the total force in the direction of the motion of the train and the velocity of the train. The total power from the propulsion system needed to move the train is the sum of the acceleration power, levitation loss power, super conducting shield loss power, wind drag power, and power transfer drag. Local coil control manages the turn-on, magnitude, wave shape, and polarity control of each coil inverter. In managing local coil control, two aspects must be considered. First, the voltage across the coils is proportional to speed. Second the current in the coils is proportional to force. Magnetic field sensors in the guideway sense the approaching train and initiate the waveform power generation control cycle.

Figure 1:
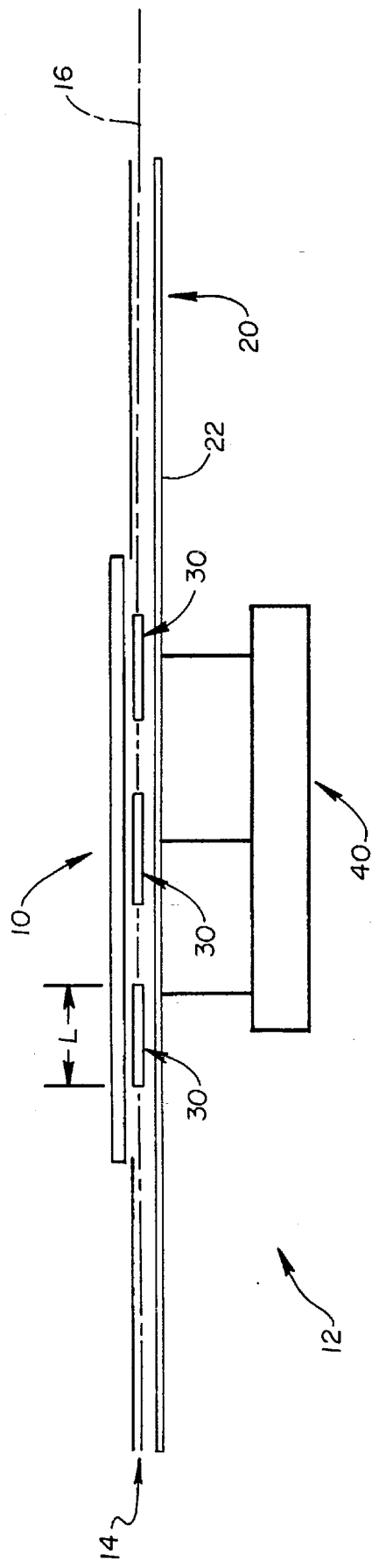
FIG. 1 shows a simplified diagram of a MAGLEV train using a linear motor.

FIG. 1 shows a simplified view of a maglev train 10 using a linear electric motor 12 (discontinuous rotor magnetic field) for propulsion and power. The depicted motor 12 includes and active guideway 14 with a drive coil assembly 20 having a plurality of coils 22, shown in more detail in FIGS. 5 and 6, that are placed at intervals along guideway 14. A linear motor with an active vehicle is also possible. The coils 22 are aligned lengthwise, defining a longitudinal axis 16. The motor 12 also includes at least one magnet assembly 30, also better seen in FIGS. 5 and 6, mounted on the train 10 and disposed in a spaced opposite relationship to the drive coil assembly 20. Each magnet assembly 30 has a length L measured along the longitudinal axis 16 and includes a plurality of evenly spaced magnetic pole ends described in more detail hereinafter. Power and control circuitry 40 is electrically coupled to the coil assembly 20.

Although depicted on the bottom of the train 10, it is to be understood that the magnet assemblies 30 may be mounted on the sides or on the top of the train 10. Likewise, the drive coil assembly 20 may be correspondingly placed on different positions along the guideway 14 to maintain its spaced, opposed relationship with the magnet assemblies 30.

Inverters are used to regulate the necessary electrical power to and from the coils. There are two main approaches known in the art for coupling the circuitry 40 to the drive coil assembly 20. The Block Switched Method (not shown) connects an inverter to a block of adjacent coils. The Locally Commutated Linear Synchronous Method (LCLSM), shown in FIG. 2, connects a separate inverter 42 to each coil 22.

Figure 3:
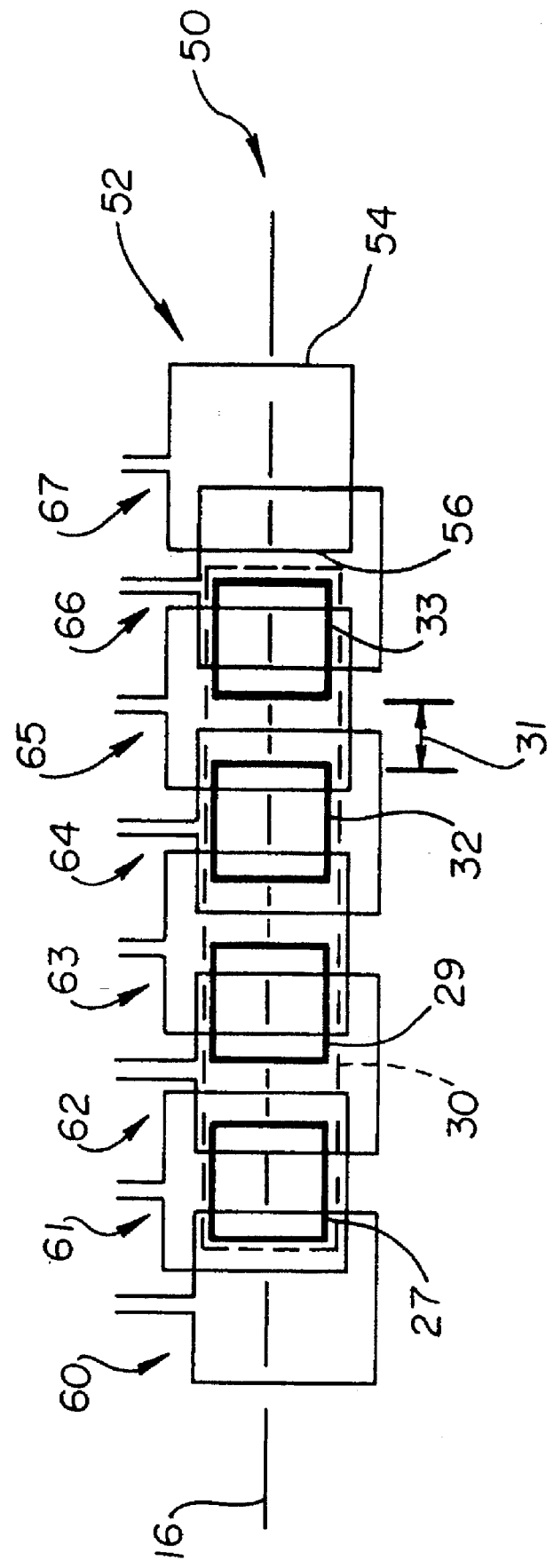
FIG. 3 shows a prior art drive coil assembly and associated pole magnet assembly.

FIG. 3 shows a small coil 52 of a prior art drive coil assembly 50 in a succession of positions 60–67 as it moves from left to right relative to the magnet assembly 30 (or as the magnet assembly 30 moves right to left over the stationary coil 52). The magnet assembly 30 has four pole ends 27, 29, 32, and 33 with alternating magnetic polarity. The pole ends are spaced from each other a separation 31. The different coil positions 60 to 67 are offset vertically only for drawing clarity. The length along the longitudinal axis 16 of coil 52 is not greater than the sum of the length of a magnet 32 plus the separation 31 between magnets 32 and 33. The coil 52 is generally square and has two flux cutting sides, a first side 54, in this case the leading side, and a second side 56, in this case the trailing side. Because of the dimensions of the coil 52, both the first side 54 and the second side 56 of the coil 52 are simultaneously cut by magnetic flux lines in positions 62, 63, and 65.

FIG. 4 illustrates the back EMF voltage waveform in the coil 52 of FIG. 3 when it moves through positions 60–67 with respect to a magnetic assembly 30 with alternate poles. A vertical axis 170 indicates back EMF and a horizontal axis 177 indicates time. In the initial position 60, only the leading first side 54 of the coil is cut by the magnetic flux of the first pole end 27, thus creating a back EMF of one unit of voltage 171. In position 61 the back returns to zero, while the coil 52 straddles the first pole end 27. However, by the time the leading first side 54 of the coil 52 is traversing the second pole end 29, as in position 62, the trailing second side 56 is traversing the first pole end 27. Because of the reversal of polarity between the first pole end 27 and the second pole end 29 and the 180 degree turn difference between the first side 54 and the second side 56, the EMF effect on the leading first side 54 adds to the EMF on the trailing second side 56, creating a back EMF of double the magnitude level 173 and opposite electrical polarity as that of position 60. Positive double voltage 172 occurs in positions 63, and negative double voltage 173 occurs at position 65. Single voltage 171 occurs at positions 60 and 66. The two voltage levels double the voltage requirements for the inverter 42. Because of the magnitude and polarity of the required voltages, each inverter 42 must have four power levels.

The present invention reduces the voltage requirements of the inverter 42 necessary to power a coil by a factor of two. This also reduces the voltage-current rating (V×A) of the inverter by two. To optimize the inverter 42, first the peak volts and amperes must be leveled out. On a short duty cycle system the RMS value can be reduced by increasing the ON time, that is, by "stretching out" the pulse. The entire system has to be designed to reduce the load on the inverter 42. The load on this inverter 42 is a propulsion drive coil.

FIG. 5 shows a first position for a drive coil assembly 20 and a magnet assembly or rotor 30, for use in a linear motor 12 according to the present invention. FIG. 6 shows the magnet assembly 30 displaced to a second position with respect to the drive assembly 20. The magnet assembly 30 comprises a plurality of uniformly spaced magnets having pole ends 27, 29, 32 and 33. The magnetic pole ends 27, 29, 32, 33 of the magnet assembly 30 are shown with heavy lines. Each pole end emits a magnetic field with flux lines extending from each of the pole ends 27, 29, 32, and 33. The principal flux lines for the electric motor are those orthogonal to the coil 22. The magnet assembly 30 has a length L and a width W transverse to the longitudinal axis 16. Each pole end 27, 29, 32, 33 has a length P along the longitudinal axis 16 and a width W transverse to the longitudinal axis 16.

Each coil 22 is shown as a single line loop. However, it is to be understood that each coil 22 usually has conductive wire wound a plurality of turns therein. The coil loops 22 are shown offset vertically to aid in the visualization of the coil configuration. Each coil 22 has a length measured along the longitudinal axis 16 and a width transverse to its length. The coils 22 are generally shaped as rectangles or polygons and have a first flux cutting side 24 and a second side 26 at their longitudinal ends.

In the linear motor 12, the pole ends 27, 29, 32, 33 of the magnet assembly 30 face the drive coil assembly 20. All are centrally aligned with respect to the longitudinal axis 16 and are disposed in a spaced, opposed relationship to each other. During operation of the linear motor 12, the magnet assembly 30 and the drive coil assembly 20 experience relative movement with respect to each other along the longitudinal axis 16. The source of this relative movement is the train 10 moving along the guideway 14. FIG. 6 depicts the same magnet assembly 30 and coil assembly 20 of FIG. 5, displaced from each other, as would occur after a lapse of time with the train 10 moving along guideway 14.

By singling out one coil 22 in FIG. 5 and 6, one can see that each coil of the present invention has only one side crossing the magnet assembly 30 at a time. This is because the length along the longitudinal axis of the coil 22 in the present invention is significantly increased with respect to the prior art, so that each coil 22 is as long or longer than the length L of the magnet assembly 30. Preferably, each coil is also as wide or wider that the width W of the magnet assembly 30. Therefore, the first leading side 24 of each coil 22 is cut by the magnetic flux lines perpendicular to the pole ends 27, 29, 32, 33 of the magnet assembly 30 before the second trailing side 26 of the same coil 22 is cut by any such flux lines.

The magnet assembly 30 shown in FIG. 5 and 6 has several magnets with their pole ends 27, 29, 32, and 33 placed side by side with a space between each magnet. The magnetic polarity of adjacent pole ends 27, 29, 32, and 33 in the magnet assembly 30 of FIG. 5 alternates, south pole, then north pole, and then south and north again. The preferred embodiment of magnet assembly 30 uses super conducting magnets (SCM).

Figure 7:
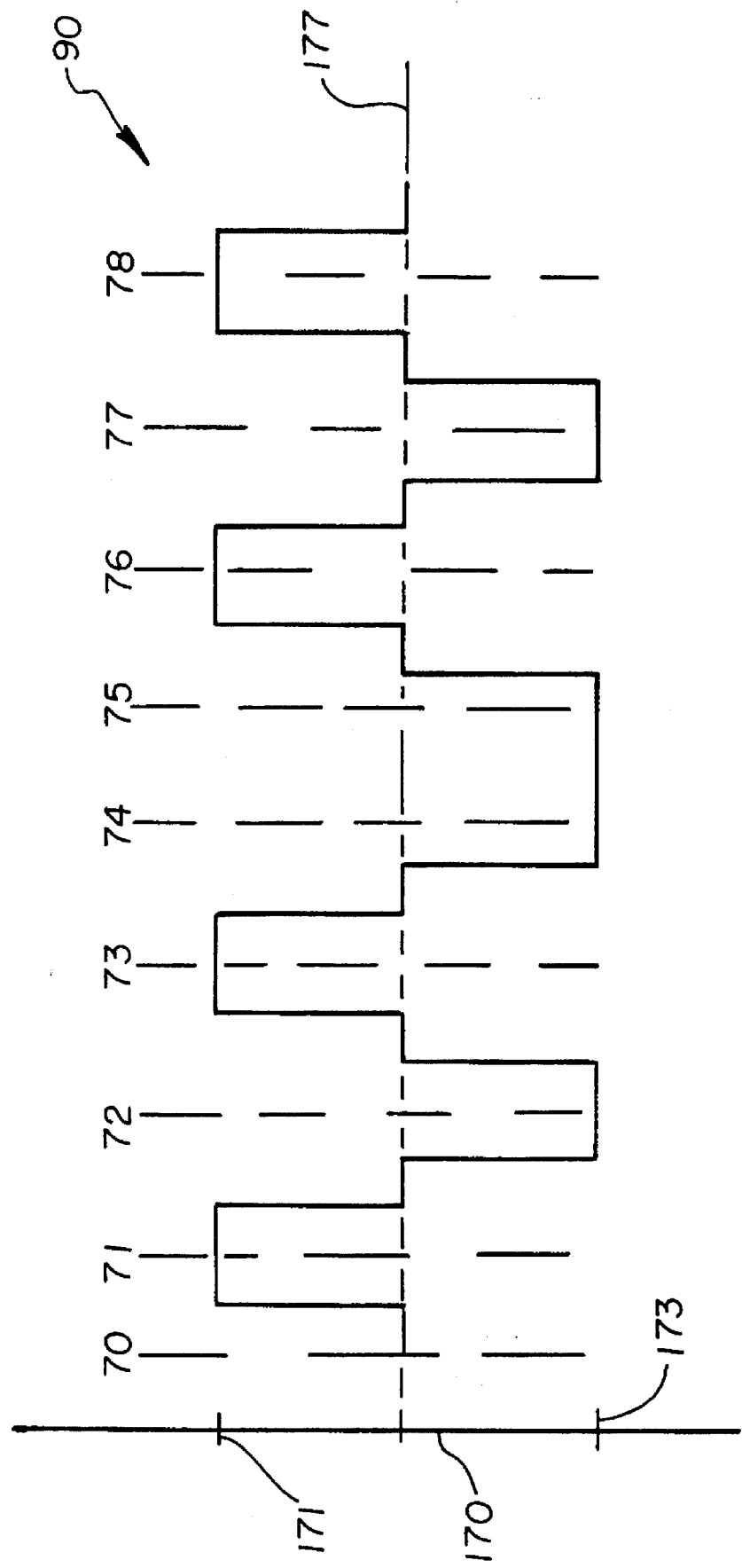
FIG. 7 shows the back EMF vs. time graph of the improved coil of FIG. 5 crossing a four pole magnet assembly.

FIG. 7 shows a back EMF waveform 90 created on coil 22 as the magnet assembly 30 moves from right to left over the coil 22. Again, the vertical axis 170 indicates back EMF and the horizontal axis 177 indicates time. The waveform would be the same if the coil 22 crossed the magnet assembly 30 moving left to right. Since only one side of the coil 22 cuts a magnetic field at a time, there are no added EMF voltages and the voltage waveform has only one positive voltage level 171 and one negative voltage level 173. At time 70, before the magnet assembly 30 and the coil 22 cross, the back EMF is zero. At time 71, the back EMF rises to one positive unit 171 as the first side 24 crosses the first pole end 27. The EMF drops to zero as the first side 24 crosses the gap between pole ends 27 and 29, and drops to negative one unit of voltage 173 at time 72 when it crosses the reverse polarity of the second pole end 29. The pattern repeats itself, at times 73 and 74, with the third and the fourth pole ends 32 and 33. Since the coil 22 of FIGS. 5 and 6 is exactly L long, just as the first side 24 finishes crossing the last pole end 33, the second side 26 starts crossing the first pole end 27 and the whole waveform 90 repeats again at times 75–78. But since there is a 180 degree turn difference between each side, the second half of the waveform 90 has opposite polarity than the first half. Once the magnet assembly 30 completely passes over the coil 22, the back EMF returns to zero. This same waveform is repeated by all coils as the magnet assembly 30 moves along the longitudinal axis 16.

Since the first side 24 and the second side 26 of coil 22 never cross the magnet assembly 30 at the same time and therefore could not cancel each other out, all the pole ends 27, 29, 32, and 33 in the present invention could be aligned with equal polarities. This would result in a back EMF waveform having only one voltage level.

Figure 2:
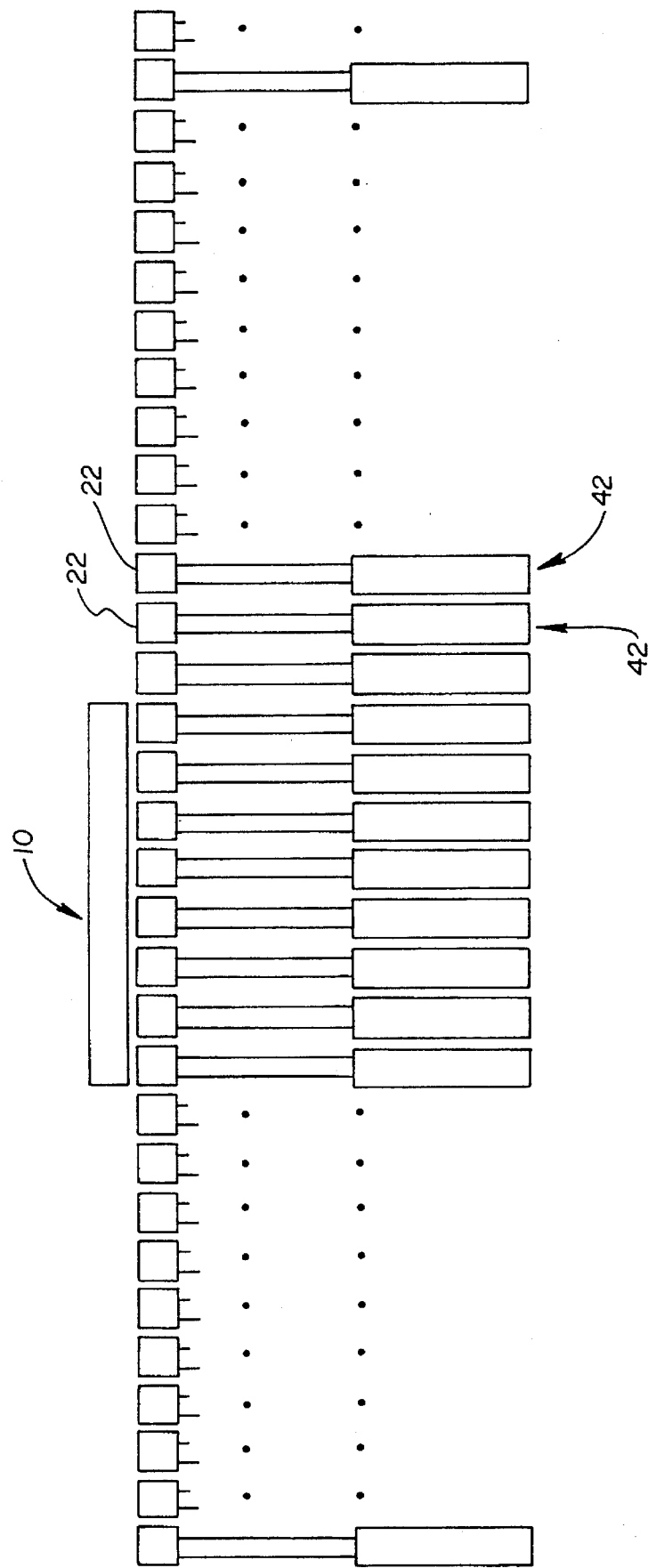
FIG. 2 shows inverters connecting to coils using the Locally Commutated Linear Synchronous Method.

If the coils were shorter in the longitudinal axis 16, as in FIG. 2, both sides 24 and 26 of the coils would be crossed by flux lines at the same time, doubling the back EMF voltage. This would double the voltage required from the inverter at the same current. Holding the voltage to the single unit of magnitude allows the use of an inverter with half the V×A rating, or the use of half as many inverters per coil. This more efficient use of components and significant savings are achieved without decreasing the propulsion power generated by each coil.

A second important part of the coil placement design is that the number of coils 22 that cut the flux field of each pole end 27, 29, 32, and 33 is constant. As better seen in FIG. 6, with the four pole end configuration, each pole end's orthogonal magnetic field cuts two coils 22 at all times (it is to be understood that the situation shown in FIG. 5, with coils 22 just at the edge of each pole end, does not actually happen since in reality coils 22 have a thickness not shown by the linear drawings). A total of eight coils provide power at any given time. The V×A rating for the necessary inverters is the same for all eight coils 22 and is one half that of traditional configurations. In this embodiment the pole ends 27, 29, 32, and 33 are evenly spaced a distance equal to half of P and are equal in length. The length of coil 22 is equal to L, and the coils are spaced a distance of P from each other.

The number of coils crossing each pole end in a magnet assembly having a plurality of pole ends at any given time will be constant as long as the pole ends are equal in size and evenly spaced, the length of the coils 22 is a integer factor of the length of the magnet assembly 30, and the coils 22 are evenly separated from each other a distance equal to a fraction of the length of each magnet 32. In this way, the number of coils 22 that cut the magnetic flux field of each magnet at any given time during operation of the linear motor is constant. Other embodiments where the length of the coil 22 is greater than the length of the magnet assembly 30 and the coils 22 are arranged in blocks is also possible.

The next approach to reducing the size of the load on the inverter 42 is to consider the incremental force and velocity requirements throughout the system. As mentioned above, the voltage on the coils 22 is proportional to speed of the magnet assembly 30 and the current in the coils 22 is proportional to the propulsion force on the magnet assembly 30. With the current at a constant level, the force and power transfer in the motor 12 is a constant. The voltage on the coil 22 is a function of the strength of the magnetic field, the velocity of the coil 22 crossing the field, and the width of the coil 22 inside the magnetic field.

Large force at low velocity is usually required when the MAGLEV train 10 is leaving a station. If high speed operation is not needed near the station, it is preferable to use the following approach. For the low speed range from zero to ⅓ of full speed, the coils 22 have their turns increased by a factor of three. This triples the ampere turns and propulsion force without increasing the current rating of the inverter 42. In the transition range from approximately ⅓ to approximately ⅔ of full speed, the number of turns is doubled. In the high speed range from approximately ⅔ of full speed to full speed the number of turns in the coils 22 is normal. Of course, more or less speed divisions could be used. This approach is also useful on other low speed-high force areas of operation such as on relatively long and steep uphill grades.

The present system can be used both to propel the train and to slow down the train. If a certain voltage and current values on the coils 22 propel the train 10 forward, reverse polarity values will slow down the train. In such operation, the linear motor 12 could also act as a generator using the train's inertial momentum to generate electrical power that can be stored and reused later.

The invention is not to be taken as limited to all of the details thereof as modifications and variations thereof may be made without departing from the spirit or scope of the invention.

What is claimed is:

1. A drive coil assembly for a linear motor of the type having a magnet assembly including a plurality of evenly spaced pole ends and having a predetermined length along a longitudinal axis and a width transverse to the longitudinal axis, the drive coil assembly comprising:

a plurality of regularly spaced wire coils, each coil including conductive wire wound a plurality of turns and having a length along the longitudinal axis and a width transverse to the longitudinal axis, wherein each turn of each coil is at least as long as the magnet assembly in the longitudinal axis direction.

2. The drive coil assembly of claim 1, the coils being at least as wide as the magnet assembly.

3. The drive coil assembly of claim 1, wherein the number of coils that cut an orthogonal magnetic flux field of each pole end at any given time during operation of the linear motor is constant.

4. The drive coil assembly of claim 1 wherein the pole ends in the magnet assembly are evenly spaced and equal in length, and wherein the length of the coils is a integer factor of the length of the magnet assembly and the coils are evenly separated from each other a distance equal to a fraction of the length of each pole end, so that the number of coils that cut an orthogonal magnetic flux field of each pole end at any given time during operation of the linear motor is constant.

5. A linear electric motor for propelling and powering a magnetically levitated train, the linear electric motor comprising:

at least one magnet assembly including a plurality of evenly spaced pole ends, each pole end having a magnetic flux field and a magnetic polarity, the magnet assembly having a predetermined length along a longitudinal axis and a width transverse to the longitudinal axis, and wherein the pole ends are aligned along the longitudinal axis;

a drive coil assembly including a plurality of wire coils, each turn of each coil having a length measured along the longitudinal axis and a width transverse to the longitudinal axis, each coil also having flux cutting sides at its longitudinal ends, wherein the length of each turn of each coil is at least as long as the predetermined length of the magnet assembly;

wherein the pole end of each magnet assembly and a section of the drive coil assembly are disposed in an opposed spaced relationship with respect to each other along the longitudinal axis;

such that during motor operation, the magnet assembly moves with respect to the drive coil assembly along the longitudinal axis and each turn of each coil is cut by only one magnetic flux field at a time.

6. The linear electric motor of claim 5, further comprising power and control circuitry including a plurality of electrical inverters, each inverter coupled to at least one of the coils of the drive coil assembly.

7. The linear electric motor of claim 5, wherein the pole ends in the magnet assembly are oriented with alternate magnetic polarity.

8. The linear electric motor of claim 5, wherein the pole ends in the magnet assembly are the pole ends of super conducting magnets.

9. The linear electric motor of claim 5, wherein each coil is at least as wide as the width of the magnet assembly.

10. The linear electric motor of claim 5, wherein the number of coils that cut an orthogonal magnetic flux field of each pole end at any given time during operation of the linear motor is constant.

11. The linear electric motor of claim 5, wherein the pole ends in the magnet assembly are evenly spaced and equal in length, and wherein the length of the coils is a integer factor of the length of the magnet assembly and the coils are evenly separated from each other a distance equal to a fraction of the length of each pole end, so that the number of coils that cut an orthogonal magnetic flux field of each pole end in the magnet assembly at any given time during operation of the linear motor is constant.

12. The linear electric motor of claim 5, wherein the coils have the same length as the magnet assembly and the pole ends in the magnet assembly are equal in length and separated from each other by a distance equal to one half the length of each pole end, wherein adjacent coils are separated from each other a distance equal to the length of one pole end, such that the number of coils that cut the magnetic flux field of each pole end in the magnet assembly at any given time during operation of the linear motor is constant.

13. The linear electric motor of claim 5, wherein the coils of the drive coil assembly define a path and the coils are aligned lengthwise at intervals along the path.

14. The linear electric motor of claim 6, wherein the power and control circuitry induce an EMF on selected coils of the drive coil assembly, such that the selected coils exert a propulsion force on the magnet assembly.

15. The linear electric motor of claim 5, wherein the coils are shaped generally as rectangles.

16. The linear electric motor of claim 5, wherein each coil comprises a predetermined number of turns of conductive wire.

17. The linear electric motor of claim 5, wherein the predetermined number of turns for each coil varies in inverse proportion to the speed and in direct proportion to the force desired as an output from the linear motor when the magnet assembly is opposed to that coil.

18. A linear synchronous motor system for powering and propelling a magnetic levitation train on a track, the linear motor system comprising:

at least one magnet assembly mounted lengthwise on the train, each magnet assembly including a plurality of uniformly spaced super conducting magnets placed side by side with alternating polarities, each magnet having a magnetic flux field and a pole end, the magnet assembly having a predetermined length along a longitudinal axis and a predetermined width transverse to the longitudinal axis, and wherein the pole ends are aligned with the longitudinal axis;

a drive coil assembly including a plurality of generally rectangular wire coils placed lengthwise at intervals along the track, each turn of each coil having a length along the longitudinal axis and a width transverse to the longitudinal axis, and flux cutting sides at its longitudinal ends, wherein each turn of each coil is at least as long as the predetermined length of the magnet assembly;

wherein the pole ends of each magnetic assembly and at least a portion of the drive coil assembly are disposed in opposed, spaced relationship along the longitudinal axis.

19. The linear synchronous motor system of claim 18, further comprising power and control circuitry including a plurality of electrical inverters, each inverter coupled to at least one of the coils of the drive coil assembly.

20. The linear synchronous motor system of claim 19 wherein the power and control circuit regulates the movement of the train by forcing a current through an active portion of the coil drive assembly including at least the portion of the drive coil assembly in the opposed, spaced relationship to each magnet assembly at any given time, creating a traveling field that moves along with each magnet assembly.

21. The linear synchronous motor system of claim 18, wherein a number of coils that cut the magnetic flux field of each pole end at any given time is constant.

22. The linear synchronous motor system of claim 18 wherein each coil comprises a wire wound in a predetermined number of turns and wherein the number of turns in a coil is: (i) inversely proportional to the speed the train is expected to travel at that point on the track and (ii) directly proportional to the force required to propel the train at that point on the track.

* * * * *

UNITED STATES PATENT AND TRADEMARK OFFICE
CERTIFICATE OF CORRECTION

PATENT NO. : 5,497,038

DATED : March 5, 1996

INVENTOR(S) : John D. Sink

It is certified that error appears in the above-identified patent and that said Letters Patent is hereby corrected as shown below:

Column 1, line 25, "+" should be --'--.

Column 3, line 40, insert --EMF-- after the word "back".

Signed and Sealed this

Fourth Day of June, 1996

Attest:

BRUCE LEHMAN

Attesting Officer     Commissioner of Patents and Trademarks